United States Patent [19]

Bublitz et al.

[11] Patent Number: 5,869,823
[45] Date of Patent: Feb. 9, 1999

[54] METHOD AND SYSTEM FOR IMPROVING THE INTEGRITY OF DATA ON A SMARTCARD

[75] Inventors: Hermann R. Bublitz, Boblingen; Walter Hanel, Holzgerlingen; Klaus Rindtorff, Weil i.Schonbuch, all of Germany

[73] Assignee: International Business Machines Corporation, Armonk, N.Y.

[21] Appl. No.: 778,801

[22] Filed: Jan. 3, 1997

[30] Foreign Application Priority Data

Jan. 3, 1996 [DE] Germany ................. 196 00 081.5

[51] Int. Cl.$^6$ ......................................... G06K 51/00
[52] U.S. Cl. ............................. 235/380; 235/382
[58] Field of Search .................... 235/380, 382, 235/382.5, 379

[56] References Cited

U.S. PATENT DOCUMENTS

| | | | |
|---|---|---|---|
| 5,012,407 | 4/1991 | Finn | 235/454 |
| 5,243,175 | 9/1993 | Kato | 235/435 |
| 5,361,228 | 11/1994 | Adachi et al. | 235/435 |
| 5,479,511 | 12/1995 | Naccache | 235/380 |
| 5,495,098 | 2/1996 | Pailles et al. | 235/380 |
| 5,532,463 | 7/1996 | Debelleix et al. | 235/380 |
| 5,635,695 | 6/1997 | Feiken | 235/380 |
| 5,637,859 | 6/1997 | Menoud | 235/380 |
| 5,689,100 | 11/1997 | Carrithers et al. | 235/380 |

*Primary Examiner*—Anita Pellman Gross
*Assistant Examiner*—Drew A. Dunn
*Attorney, Agent, or Firm*—Kenneth A. Seaman; Karl O. Hesse

[57] ABSTRACT

A method and a system are proposed for increasing the data integrity on smartcards. In accordance with the invention a sequence of write processes on a smartcard is defined as a unit for which the integrity of the data to be written is ensured. The write process may involve the writing of data to one or more files. The data of an integrity unit i.e. a unit of data for which the integrity is to be ensured is preferably written to shadow memory. The method in accordance with the invention decreases considerably the likelihood that data will be corrupted through an error in writing the data on the smartcard. Data can be restored or completed through the interface of read-write units. The method in accordance with the invention can serve as a basis for maintaining data files external to the smartcard consistent with data on the smartcard.

12 Claims, No Drawings

METHOD AND SYSTEM FOR IMPROVING THE INTEGRITY OF DATA ON A SMARTCARD

BACKGROUND OF THE INVENTION

1. Field of the Invention

The invention concerns data integrity in applications employing smartcards.

2. Prior Art

Secure smartcards today find application in a number of different functions and are being used in increasing numbers. To some extent the data on the smartcard may be of considerable value, such as-means of payment payment limits or personal (e.g. medical) data. Data protection legislation and the fact that it is a smartcard personal data store make it difficult to provide data security. For these reasons the highest demands are made on the integrity of the data on a smartcard. With the anticipated large numbers in the expansion of smartcards even low error rates can lead to a considerable number of errors.

The expression integrity of data means freedom from errors in the sense that they retain the information entered on them as an accurate picture of the reality and can therefore be used for meaningful data processing. Correspondingly consistency of the data signifies agreement of the data with the reality which they represent. For this both a formal (physical condition) and a contextual (semantic functional) requirement must be fulfilled.

The integrity of the data on a smartcard is endangered particularly by physical influences both on the smartcard as such and also during a reading operation.

The most used smartcards implement the ISO standard 7816-X or the analogous national standards. In accordance with these data on the smartcard is organized in files. Parts of a file can be written as records or as any Sequence of symbols with write commands. Errors which appear in the smartcards during the writing process will be notified to the read-write equipment. If, for mechanical, electrical or electronic reasons, the writing process is not terminated and the read-write equipment and/or the smartcard cannot undertake any error correction, the data is inconsistent.

In particular, smartcards are ever more frequently employed in conjunction with non-motorized smartcard readers. Especially with these cheap readers, in which the insertion and removal of the smartcard is effected manually, the user of the smartcard can abort the process by removing the smartcard prematurely. In addition external influences such as vibration or power failure can lead to such abortions of the current use. The consequence of this may be that the aborted application leaves inconsistent data conditions on the smartcard and in the smartcard reader which makes the smartcard unusable for further application.

Two functions are for example incorporated on a smartcard: an electronic wallet and an authority to visit a fitness studio. Every month the authority is extended by debiting the fee from the wallet. This process may consist of the following steps:

Debiting the amount from the wallet

Confirming the debit through the smartcard and

Extending the authority.

If tale smartcard is now removed between the fist and second steps there will be an inconsistency: The amount is debited but the authority is not extended. Since the smartcard reacher has also not received the confirmation of the debit, its data will indicate that it has neither debited nor extended the authority. Thus the smartcard is unusable and can no longer be restored to a consistent state.

The methods known in the state of the art for writing data to smartcards provide no means of ensuring the integrity of data particularly if the writing process is aborted during writing.

SUMMARY OF THE INVENTION

It is an object of the invention to achieve an increase in the integrity of data on smartcards. The object of the invention is achieved through the independent claims.

In accordance with the invention a sequence of write processes on a smartcard is defined as a unit for which the integrity of the data to be written is secured. The write operation may involve the writing of data to one or more files.

An integrity unit, i.e. the unit of data for which the integrity has to be ensured, is preferably identified by a tag. The start of an integrity unit is preferably implemented on the smartcard by a defined start command or as an alternative, by a tag set down in each write command. The end of the integrity unit is preferably indicated by a sequence of commands, which lead to a successful transfer operation to a firm writing of the data into a memory on the smartcard or, with an unsuccessful transfer operation, breaks off the write operation.

The data of an integrity unit is preferably written to a shadow memory. Shadow memory can for example, be implemented as a complete copy of the file into which the data are to be written or as copies of the data portion of a file, which are to be written, whereby the data header contains a reference to the original data. In addition, the shadow memory can be implemented as copies of the file records in which the data are to be stored in record-oriented files where the file header contains reference to sequential records.

The end of an integrity unit is preferably indicated with a sequence of two commands such as for example 'Write initialize' and "Write" or by a command which causes an abortion of the writing process of the integrity unit such as for example 'Write abort'. With the 'Write initialize' command the new data is initialized in such a way that the validity of the new data can be established with a minimum of expenditure on writing. This may, for example, be effected by attaching an index of data, which incorporate a reference to currently valid data. With the 'Write' command the validity of the new data is established, an acknowledgment is issued to the read-write equipment and the new data established as valid data. The memory for the previously valid data can be released and, for example, be used as a further shadow memory. It is to be understood that the allocation of a storage region as shadow memory must not be permanent but the allocation may be defined as required, as a dynamic process.

By means of the method in accordance with the invention, the likelihood that errors will interfere with the integrity of the data, can be considerably reduced.

With the corresponding command which causes an abortion of the writing of the integrity data, such as, for example, 'Write abort', the shadow memory is released for re-use. The original data is still available.

A further command such as for example, 'Integrity status', preferably serves to query the status of the integrity unit, i.e. for example whether an integrity unit has not yet terminated and which one. On the basis of this information, the integrity unit can, e.g. after an error in the read-write equipment, be aborted or terminated normally in another read-write unit.

The method in accordance with the invention considerably reduces the likelihood that the integrity of the data will be compromised by an error in writing the data on a smartcard. Data can be reconstituted or completed across the boundary of a read-write unit. The method in accordance with the invention can serve as the basis for maintaining data outside the smartcard consistent with data on the smartcard.

Integrity units can advantageously be defined, for example, as so-called transactions, as known from the field of database systems.

Further advantageous embodiments of the invention are to be found in the sub-claims.

DETAILED DESCRIPTION OF THE INVENTION

The data files of the individual smartcard functions and the data of the reading unit or of the driving computer form, a distributed data base. One method of keeping a distributed data base consistent, is transactions. A transaction is established as an integrity unit, i.e. as a unit of data for which the integrity should be ensured. Transactions are characterized, in particular, by four properties. Transactions are:

indivisible i.e. they are either completely executed or not at all, which can be achieved by a 'two phase commit' process;

consistency-maintaining, i.e. the data of a transaction-protected data record are coherent, which is achieved with the aid of the 'two phase commit' process;

isolated, i.e. transactions taking place in parallel have no influence on one another which is managed by a blocking of the data required from one application for other applications;

durable, i.e. the durability of the changes to a data file is directly coupled in the case of the smartcard with durability of the data stored in a writable non-volatile memory (e.g. an EEPROM) on the smartcard, as a result of which the durability for the data on the smartcard is satisfactory.

The problem of the isolated or parallel transactions can also be circumvented on the smartcard by always allowing only one transaction at a time.

The 'two phase commit' method in accordance with the invention for smartcard data guarantees that either all action on the smartcard are transferred during a transaction or none at all. In order to implement this 'two phase commit' method it is necessary to define:

a start for the transaction,
either implicit by
  supplying power to the smartcard ('power on')
  a write access to the transaction-protected data,
or explicitly
  through a predetermined transaction command such as for example: 'Begin transaction' or 'Start transaction';
a range of transaction-controlled commands, such as, for example:
  'Prepare to write' or 'Prepare to commit' (Preparation at the end of the transaction)
  'Write' or 'Commit' (End of transaction)
  'Abort write' or 'unroll' (Abort the transaction)

The smartcard must, in addition be in a position to undo changes to a data file from the point where the transaction starts. This can be achieved by duplicating the data file which is to be altered into a shadow memory and making the changes only to half of the data, namely either to the copy or to the original. Preferably the changes will be made only to the copy stored in shadow memory. If the transaction is successfully carried out, the altered half of the data will be declared the valid part. If the transaction is not successfully carried out, and hence for example aborted the unaltered half will remain valid.

For permanent storage of alterable data EEPROS memory (Electrical Erasable Programmable Read Only Memory) is used in smartcards as writable, non-volatile memory, which is characterized, in particular, by the following properties:

erasure of data, i.e. resetting the individual memory cells of the EEPROM to an inactive state, is only possible in large units so-called 'pages' (e.g. 32 bytes) (the size of the unit is generally pre-determined by the manufacturer);

it is possible to set data bitwise, i.e. activation of the individual memory cells can be carried out independently of the other memory cells within the selected 'page';

the number of erase-write cycles is, however, limited by the life of the EEPROM (of the order of $10^4$ erase-write cycles), so that excessively frequent writing to a memory address must therefore be avoided.

In other words erasure is only possible collectively for a full 'page', which data within the 'page' can be individually set. Amendment of data is generally effected by erasing the 'page' on which the data is located together with other data records and subsequently writing the amended data and the data records which have not been amended. If this process is aborted, e.g. by a power failure, all data records on the 'page' become invalid. This shows that data records, which lie on a common 'page', can effect one another.

The property of the EEPROM that erasure of data is only possible in large units, so-called 'pages', must be taken into account by duplicating the data in EEPROM memory. Care must therefore be taken that the two halves (original and copy in the shadow memory) of the data file, do not fall on the same 'page', so that mutual influence can be excluded.

With large data files, the data can be subdivided into transaction units. This has the advantage that only those transaction units have to be copied which were also amended.

If it is certain that only one unit of a large data file which is subdivided into units is amended per transaction then only one shadow memory is required for this unit. Consequently, less memory space has to be made available for the shadow memory.

So that copy and original can be kept separately each is advantageously provided with a counter. In setting up the copy, the counter, for example, is increased by 1. As a result, the value of the counter will indicate how up-to-date the data is (higher number=newer data). The use of the counter has the advantage that no data of the original needs to be altered.

Since there are only two versions of the data record (original and copy) for the transaction to be carried out and the counter for these copies differs by only 1, a modulo counter can be used. This also avoids the problem of a counter over-running. By using, e.g. a modulo 4 counter the older copies can be determined, as follows: if the counter status of the selected version +1 modulo 4 gives the counter status of the other copy, it is an older version of the data record. Using the tables 2 and 3 hereinafter reproduced, it is possible to determine which data are valid at a given point in time.

For managing the status and coordination of the transaction, each transaction unit is advantageously given a status as follows:

'Data_Opened', i.e. this version of the transaction unit was newly entered and is available for amendment;

'Data_Prepared', i.e. all amendments are completed on this version of the transaction unit and no more can be carried out;

'Data_Committed', i.e. this version of the transaction unit in the shadow memory is defined as the newly valid version of the data record;

'Data_Unrolled', i.e. the amendments in shadow memory are defined as invalid and the shadow memory can be reused.

These statuses must be represented by bit combinations in the EEPOM memory. Because of the erasure of 'pages', undesired intermediate statuses can arise, i.e. bit combinations which describe neither the initial nor the final state. To avoid this, the intermediate states are advantageously represented in EEPROM in such a way that the status sequences:

Data_Opened, Data_Prepared, Data_Committed
Data_Opened, Data_Prepared, Data_Unrolled
Data_Opened, Data_Unrolled only require an activation of data elements in EEPROM and consequently no erasure is required. This can be effected e.g. by the following status representations of the as shown in Table 1, where a 1 stands for an active bit in the EEPROM.

TABLE 1

Example of a status table for a transaction where x means 'Any status'

| Status | Representation |
|---|---|
| 'data opened' | '000' |
| 'data prepared' | '001' |
| 'data committed' | '011' |
| 'data unrolled' | '1xx' |

At the start of a new transaction, the status 'data_unrolled' must be converted to the status 'data_opened'. This now requires an erasure of the representation of the status in memory (cf. Table 1). Consequently, the undesired intermediate statuses '011' and '001' can arise through abortion of the erasure process. In order that these intermediate statuses do not lead to an undesired result, the valid data are copied into the shadow memory prior to erasure. Thus both data records (original and data in shadow memory) correspond to the valid version and on the appearance of intermediate statuses either of the valid versions may be selected.

In addition a global marker can also be used such as for example, 'Transaction_in_Process', which indicates whether a transaction is active. The global marker thus allows recognition of intermediate statuses. Intermediate statuses can only appear if the global marker 'transaction_in_process' indicates that no transaction is active. Consequently the global marker is only set to active if the copy has the 'data_opened' status.

Counters and status indicators are preferably applied to 'pages' separated from the data so that the writing of the data cannot effect the statuses. This also applies to the counters and status indicators of different versions of data records.

From the counter and number of both versions of the data records and the global marker 'transaction_in_process' it is possible to tell at any point in time which data are valid at the start of a new transaction. The following tables 2 and 3 show the possible allocations. Here 'old' means that this version of the data record has the lower status number.

TABLE 2

Validity table for the global marker 'transaction_in_process' active:

| 'old' data | 'new' data | valid |
|---|---|---|
| 011 | 000 | Here, the old data are valid The foregoing transaction was aborted. Since the status 'Data Prepared' has not been reached, the new data can be erased. |
| 011 | 001 | The validity of the data must be determined by the application since the previous transaction was aborted. |
| 011 | 011 | Here, the 'new' data are valid. The previous transaction was successful but the processing of the transaction was aborted before the 'old' data could be invalidated. The 'old' data can be deleted. |
| 011 | 1xx | Here, the 'old' data are valid. The preceding transaction was aborted. The status 'Data_Enrolled' indicates that the 'new' data can be deleted. |

TABLE 3

Validity table for the global marker 'transaction_in_process' not active:

| 'old' data | 'new' data | valid |
|---|---|---|
| 001 | 000 | Here, the 'old' data are valid. The foregoing transaction was aborted. Since the satus 'Data_Prepared' has not been reached, the new data can be erased. |
| 011 | 001 | Here, both the 'old' and the 'new' data are valid. Outside the current transaction, the status 001 can only appear as an intermediate status in which both the original and the copy are valid. |
| 011 | 011 | Here, both the 'old' and the 'new' data are valid. Outside the current transaction, the status 011 can only appear as an intermediate status in which both the original and the copy are valid. |
| 011 | 1xx | Here, the 'old' data are valid. The preceding transaction was aborted. The status 'Data_Enrolled' indicates that the 'new' data can be deleted. |

Since the validity of the data can, in certain cases only be clarified with the aid of the application, the transaction is preferably allocated a unique name, so that the application can identify the protocol of the corresponding transaction run. This transaction name can, e.g. consist of a chip serial number and a current transaction number.

For implementation on a smartcard the start of a transaction can be determined by a transaction command, such as, for example, the command 'start_transaction'. If the start of a transaction is known and if no transaction of another application is being processed the valid data will be determined and copied into shadow memory. Only then will the copy be brought into the 'data_opened' status. If this is carried out successfully the global marker 'transaction_in_ process' will be set and the application advised of the current transaction number. If the valid copy could not be determined, since the preceding transaction data had been left in the 'data_prepared' status the application will be informed of this so that it can clarify which data are valid.

A suitable smartcard command for preparing the write process, e.g. 'prepared_to_write' or 'prepared_to_ commit' results in a change of STATUS from 'data_opened' to 'data_prepared'. This command is not permitted for any other status. This will be communicated to the application and no change in status will take place.

A further suitable smartcard command for carrying out the write process e.g. 'write' or 'commit', causes the copy to be changed from the status 'data_prepared' to the status 'data_ committed'. This command is invalid for any other status and no change in status will take place.

Finally another smartcard command will result in aborting the write process, e.g. 'abort_write' or 'unroll', will cause a change from the 'data_opened' status or 'data_prepared' status to the 'data_unrolled' status. The command is invalid for any other status and no change in status will occur.

TABLE 4

Table 4 shows examples of the transaction run for a completed transaction:

| Original | | | Copy in shadow memory | | |
|---|---|---|---|---|---|
| Status | Counter | Data | Status | Counter | Data |
| Status prior to starting the transaction | | | | | |
| 011 | 1 | ABCDEF | 1xx | 0 | |
| Status after the start of the transaction | | | | | |
| 011 | 1 | ABCDEF | 000 | 2 | ABCDEF |
| Status after a write access | | | | | |
| 011 | 1 | ABCDEF | 000 | 2 | XYZDEF |
| Status after 'prepare to commit' | | | | | |
| 011 | 1 | ABCDEF | 001 | 2 | XYZDEF |
| Status after 'commit' | | | | | |
| 011 | 1 | ABCDEF | 011 | 2 | XYZDEF |
| 111 | 1 | ABCDEF | 011 | 2 | XYZDEF |

TABLE 5

Table 5 shows examples of the transaction run for an aborted transaction:

| Original | | | Copy in shadow memory | | |
|---|---|---|---|---|---|
| Status | Counter | Data | Status | Counter | Data |
| Status prior to starting the transaction | | | | | |
| 011 | 1 | ABCDEF | 1xx | 0 | |
| Status after the start of the transaction | | | | | |
| 011 | 1 | ABCDEF | 000 | 2 | ABCDEF |
| Status after a write access | | | | | |
| 011 | 1 | ABCDEF | 000 | 2 | XYZDEF |
| Transaction aborted | | | | | |
| Transaction re-started | | | | | |
| Status before transaction re-starts | | | | | |
| 011 | 1 | ABCDEF | 000 | 2 | XYZDEF |

TABLE 5-continued

Table 5 shows examples of the transaction run for an aborted transaction:

| Original | | | Copy in shadow memory | | |
|---|---|---|---|---|---|
| Status | Counter | Data | Status | Counter | Data |
| Status after the start of the transaction | | | | | |
| 011 | 1 | ABCDEF | 000 | 2 | ABCDEF |
| 011 | 1 | ABCDEF | 101 | 2 | XYZDEF |
| continuation of normal transaction | | | | | |

Having thus described the invention, what is claimed is:

1. Method for improving the integrity of data during communication between a terminal and a smartcard having an EEPROM memory so that the data on the smartcard remains consistent with data in the terminal comprising the steps of: defining an integrity unit of data to be communicated by opening old data on the smartcard to preserve the old data on the smartcard comprising the steps of:

creating from an original copy of the old data another copy of the old data;

storing the another copy of the old data in another page of EEPROM memory on the smartcard;

communicating data between the terminal and the smartcard for preparing new data from one copy of the old data comprising the steps of:

amending the one copy of the old data with data received from the terminal;

completing storage of the new data in place of the one copy of the old data;

committing the stored amended copy as the valid copy when the storage of the new data has been completed; and indicating that transfer of the integrity unit of data has been successfully completed.

2. Method of claim 1 wherein the step of storing stores the another copy in a shadow memory.

3. Method of claim 1 wherein the step of amending the one copy of the old data amends the original copy.

4. Method of claim 3 wherein the step of completing storage stores the new data in memory where the original copy of the old data had been stored.

5. Method of claim 1 wherein the step of amending the one copy of the old data amends the another copy.

6. Method of claim 3 wherein the step of completing storage stores the new data in memory where the another copy of the old data had been stored.

7. Method for improving the integrity of data on a card having a memory during communication between the card and a card read-write terminal so that the data on the card remains consistent with data in the card read-write terminal comprising the steps of:

defining an integrity unit of data by opening a file of old data on the card to preserve the old data on the card comprising the steps of:

creating from an original copy of the old data another copy of the old data:

storing the another copy of the old data in a shadow memory on the card;

changing a status table to indicate that the file of old data has been opened;

communicating data between the card read-write terminal and the card for preparing new data from one copy of the old data comprising the steps of:

amending the one copy of the old data with data received from the card read-write terminal;

completing storage of the new data in place of the one copy of the old data;

changing a status table to indicate that the file of new data has been prepared;

committing the new data as the valid copy when the storage has been completed;

indicating successful transfer of the integrity unit by changing a status table to indicate that the file of new data has been committed and the other copy of the old data can be erased.

8. Method of claim 7 wherein the step of amending the one copy of the old data amends the original copy.

9. Method of claim 8 wherein the step of completing storage stores the new data in memory where the original copy of the old data had been stored.

10. Method of claim 7 wherein the step of amending the one copy of the old data amends the another copy.

11. Method of claim 10 wherein the step of completing storage stores the new data in shadow memory where the another copy of the old data had been stored.

12. Method for improving the integrity of data on a card having a memory so that during communication between the card and a card read-write terminal the data on the card remains consistent with data in the card read-write terminal comprising the steps of:

defining an integrity unit of data by opening a file of old data on the card to preserve the old data on the card comprising the steps of:

creating from an original copy of the old data, another copy of the old data:

storing the another copy of the old data in a shadow memory on the card;

changing a status table to indicate that the file of old data has been opened;

communicating data between the terminal and the card for preparing new data from the another copy of the old data comprising the steps of:

amending the another copy of the old data with data received from the terminal;

completing storage of the new data in place of the another copy of the old data in shadow memory;

changing a status table to indicate that the file of new data has been prepared;

unrolling the new data as the valid copy when one of the steps of amending and of completing storage has been incomplete;

indicating unsuccessful completion of transfer of the integrity unit by changing a status table to indicate that the file of new data has been unrolled and that the original copy of the old data remains valid.

* * * * *